Feb. 1, 1955

J. V. TRAPANESE 2,700,787

SLOTTED RESILIENT DISK MEMBER FOR
DRYING FISHING LINES AND THE LIKE
Filed Feb. 7, 1951

INVENTOR
JAMES V. TRAPANESE
BY
Joseph B. Gardner
ATTORNEY

United States Patent Office 2,700,787
Patented Feb. 1, 1955

2,700,787

SLOTTED RESILIENT DISK MEMBER FOR DRYING FISHING LINES AND THE LIKE

James V. Trapanese, Orinda, Calif.

Application February 7, 1951, Serial No. 209,836

3 Claims. (Cl. 15—256.6)

The present invention relates in general to a fishing equipment accessory and more particularly to a line dryer which may be employed to dry a fishing line used with a rod and reel.

During use of the standard angling equipment the lines employed retain considerable amounts of water either as droplets adhering to the surface or absorbed and occupying the spaces between the fibers thereof as the line is withdrawn from the water. Mud from the bottom may also be carried by a line which comes in contact therewith. This water and mud drips from the guides and reel as the line is reeled in and falls upon the angler as well as upon the boat or dock surface upon which the angler is stationed. Accordingly a considerable degree of discomfort to the angler results and the surface is soiled by the puddles of muddy water which drop off the rod and reel. Moreover, the presence of the water in the line may promote decomposition or deterioration of the line and corrosion of the metallic parts of the rod and reel is promoted by contact with such water, particularly in the case of salt water angling. The present invention provides a means for removing the water and/or mud from the line before the line enters the tip guide of the rod at a location where the removed material may drip back into the body of water.

It is therefore an object of the present invention to provide a fishing line dryer for use in removing adherent and absorbed water from a fishing line as it is spooled on a reel.

Another object of the present invention is to provide a fishing line dryer which is adapted to remove the water from a fishing line as it is spooled on a reel mounted on a rod at a position remote from the angler.

A further object of the present invention is to provide a fishing line dryer which discards the water removed from the line at a location remote from the angler.

A still further object of the present invention is to provide a simple, compact and rugged line dryer for use in conjunction with a fishing rod which may be employed with a large variety of fishing line sizes.

Still another object of the invention is to provide a simple, compact and rugged line dryer for use in conjunction with a fishing rod which provides a variable tension to obtain optimum drying of the fishing line.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing.

The line dryer of the present invention is adapted to be clipped upon a wet line thereby presenting a pair of resilient surfaces which engage said wet line as it is drawn therebetween so as to strip almost all or at least a very substantial portion of the moisture therefrom in a squeegee-like fashion. The amount of water removed being somewhat dependent upon the character of the line.

Figure 1:
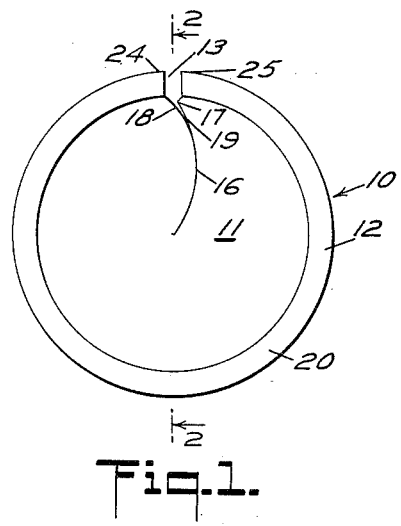
Figure 1 is a side plan view of the line dryer of the present invention.
Figure 4:
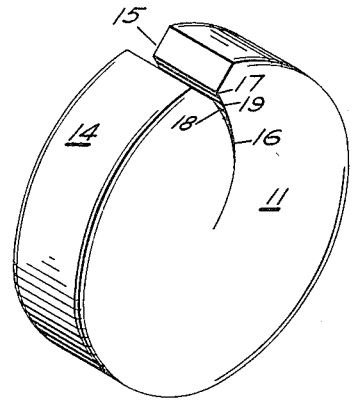
Figure 4 is a perspective view of the disk member.

Advantageously, with reference to the drawing in detail, in which similar reference numerals refer to similar elements throughout the various figures illustrated therein, and in particular to Figures 1 and 4, such a line dryer 10 may be devised as a cylindrical block or disk 11 of an elastic resilient material such as vulcanized rubber encircled by a split ring reenforcing member 12 formed with a transverse slot 13 in the periphery thereof which member 12 compressibly engages the cylindrical wall portion 14 of the block 11 and is attached thereto in any appropriate fashion. The block 11 is formed with a V-shaped groove 15 extending transversely across the cylindrical wall portion 14 thereof and also with a substantially normal transverse arcuate slit 16 extending from the apex 17 of the groove 15 into the central portion of the block 11. Defining wall surfaces 18 and 19 of slit 16 provide the resilient surfaces mentioned above which engage the wet line and the groove 15 provides a means for guiding a wet line into the slit 16 as the dryer is clipped on the line as will be more fully described hereinafter.

As stated hereinbefore, the member 12 is attached to the cylindrical block in any appropriate fashion.

Figure 2:
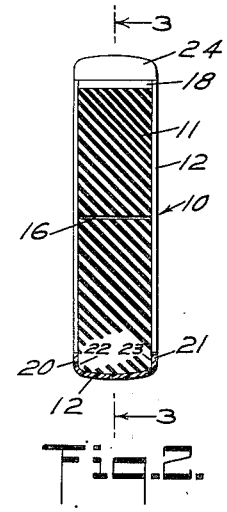
Figure 2 is a sectional elevation view taken along the plane 2—2 of Figure 1.
Figure 3:
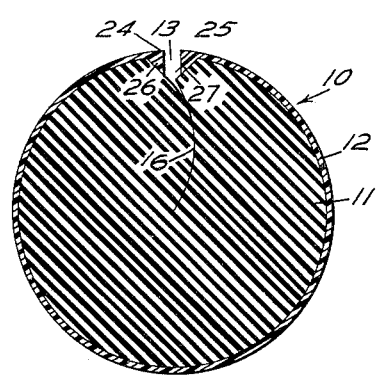
Figure 3 is a sectional elevation view taken along the plane 3—3 of Figure 2.

Preferably, with reference to Figures 2 and 3, the ring member 12 is constructed with the outer edges thereof deformed to provide the flange portions 20 and 21 extending inwardly to firmly engage the rims of terminal surfaces 22 and 23 of the block 11. In order to prevent radial turning of the block 11 within the split ring member 12 the terminal ends 24 and 25 of the member 12 are provided with a pair of inwardly inclined projections 26 and 27 which engage the sloping surfaces of the V-shaped grooves 15.

Relating strong materials which possess spring-like properties are preferred in the construction of the member 12. Molded plastic materials are preferred for this purpose, however metallic corrosion resistant materials which possess the requisite properties of strength and contraction indicated in the following discussion of the function of the member 12 may also be employed.

By employing suitable materials in a construction such as that described above the split ring member 12 offers relatively great resistance to deformation tending to twist the block 11 thereby distorting the shape of the slit 16 so as to separate the wall surfaces 18 and 19 and thereby impairing the drying action. Also the member 12 is adapted to provide some compression to aid the natural resiliency of block 11 tending to force the surfaces 18 and 19 together.

Alternately such a structure may be provided by employing a ring treated with a rubber bonding agent into which the unvulcanized rubber compound is introduced and subsequently compressed to completely fill the interior of the ring and the entire assembly heated to vulcanize and bond the rubber to the ring. Thereafter the groove may be formed by machining and the arcuate slit formed by cutting as with a knife blade.

Figure 5:
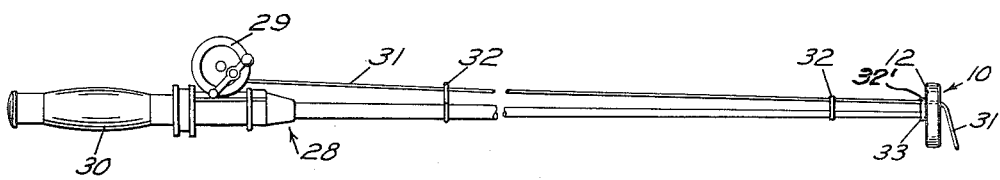
Figure 5 is a side elevation of a rod and reel illustrating a manner of employing the line dryer of the invention therewith.

The manner of employing the line dryer 10 may best be understood by reference to Figure 5 of the drawing. As illustrated therein, the line dryer 10 may be used with a fishing rod 28 having a reel 29 mounted adjacent the handle portion 30 thereof. Wound upon the reel 29 a fishing line 31 extends therefrom through the eyes of guides 32 beyond the tip terminal portion 33 of the rod 28 to be engaged by the line dryer 10, which abuts against said tip portion 33 and the tip guide 32' during the reeling in of the line 31. It will be understood that the slot in the dryer tightly engages the line to be dried and therefore when the dryer is placed on the line it is impossible for the same to fall off of the line accidently. Therefore, if the dryer is positioned as shown in Figure 5, the line may be reeled in and the dryer will be held against the tip of the rod and against the guide 32' as the line is being so reeled. It is believed apparent that the dryer cannot move outwardly from the rod when the line is being pulled in as all the frictional forces tend to urge the dryer against the rod tip.

In normal usage the line 31 may be cast or otherwise payed out so that a considerable portion is immersed in the water. Prior to reeling the line 31 in the line dryer 10 is clipped on the line 31 by introducing the line 31 into the groove 15 and thence into the arcuate slit 16 to be positioned between the surfaces 18 and 19. Accordingly, when the line 31 is reeled in the water and/or mud picked up by the line is stripped from the line 31 by the squeegee-like action of the surfaces 18 and 19.

It will be noted that any suitable tension may be applied to the line 31 and accommodation of various line sizes provided by properly choosing the position which the line 31 occupies in the slit 16. Slighter tension being applied and larger line sizes accommodated if the line 31 is positioned nearer the rim portions of the block 11 and smaller sizes and greater tension applied if the line 31 is positioned nearer the central portion of the block 11.

Further more, it is to be noted that the arcuate configuration of the slit 11 is particularly advantageous since this particular configuration stabilizes the position of the line 31 with respect to said slit 11 during the reeling in process. Thereby any tendency of the line to creep out of the slit 11 is opposed and the benefit of the invention most advantageously achieved.

I claim:

1. A fishing line dryer comprising a disk of resilient material having a transverse groove formed in the cylindrical wall portion and with a slit completely through said disk extending from the innermost portion of said groove to substantially the center of said disk, and a transversely split ring reenforcing member encompassing and attached to the cylindrical wall portion of said disk so that the transverse opening therein corresponds to said groove in the disk, said slit decreasing in width as it approaches said disk center, and said ring member being adapted to exert radially inward pressure against the peripheral wall surfaces of said disk.

2. The line dryer as defined in claim 1 wherein said slit is of an arcuate configuration.

3. A fishing line dryer comprising a disk member of resilient material having a transverse V-shaped groove formed in the cylindrical wall portion thereof and with an arcuate slit extending from the apex of said groove into the central portion of the disk, said slit being of substantially uniform varying width from a maximum width adjacent said groove to a minimum width adjacent the disk center, and a transversely split ring reenforming member encompassing the cylindrical wall portion of said disk, said ring member being provided with inwardly deformed edges which engage the disk in the surface rim areas thereof, said ring member further being provided in the terminal portions thereof with inwardly inclined projections which engage the sloping surfaces of said V-shaped groove to prevent radial turning of the disk with respect to the ring member.

References Cited in the file of this patent

UNITED STATES PATENTS

| | | |
|---|---|---|
| 664,889 | Ogimura | Jan. 1, 1901 |
| 1,868,794 | Fuller | July 26, 1932 |
| 2,255,154 | Esposito | Sept. 9, 1941 |
| 2,391,980 | Knapp | Jan. 1, 1946 |